(12) United States Patent
Pierce et al.

(10) Patent No.: US 10,515,417 B2
(45) Date of Patent: Dec. 24, 2019

(54) DEVICE BASED INCIDENT DETECTION AND NOTIFICATION

(71) Applicant: Accenture Global Services Limited, Dublin (IE)

(72) Inventors: Christopher J. Pierce, Chicago, IL (US); Matthew A. Lehman, Elmhurst, IL (US); Diegane Dione, Brooklyn, NY (US)

(73) Assignee: Accenture Global Services Limited, Dublin (IE)

( * ) Notice: Subject to any disclaimer, the term of this patent is extended or adjusted under 35 U.S.C. 154(b) by 412 days.

(21) Appl. No.: 15/018,210

(22) Filed: Feb. 8, 2016

(65) Prior Publication Data

US 2017/0109828 A1 Apr. 20, 2017

Related U.S. Application Data

(60) Provisional application No. 62/242,499, filed on Oct. 16, 2015.

(51) Int. Cl.
*G06Q 40/08* (2012.01)
*G06F 3/16* (2006.01)

(52) U.S. Cl.
CPC ............ *G06Q 40/08* (2013.01); *G06F 3/167* (2013.01)

(58) Field of Classification Search
CPC ................................ G06Q 40/08; G06F 3/167
USPC .......................................................... 705/4
See application file for complete search history.

(56) References Cited

U.S. PATENT DOCUMENTS

| 8,723,986 B1* | 5/2014 | Merrill, Jr. ............. | H04N 5/232 |
| | | | 348/207.99 |
| 9,247,779 B1* | 2/2016 | Aloumanis ............ | G08G 1/137 |
| 2009/0204382 A1* | 8/2009 | Tung ..................... | G06F 1/3203 |
| | | | 703/21 |
| 2013/0110415 A1* | 5/2013 | Davis ..................... | A42B 3/046 |
| | | | 702/41 |

OTHER PUBLICATIONS

Scism, "Car Insurers in US Find Tracking Devices Are a Tough Sell", Business Day Live, Wall Street Journal, http://www.bdlive.co.za/world/americas/2016/01/11/car-insurers-in-us-find-tracking-devices-are-a-tough-sell, Jan. 11, 2016, 9 pages.

* cited by examiner

*Primary Examiner* — Hai Tran
(74) *Attorney, Agent, or Firm* — Harrity & Harrity, LLP

(57) ABSTRACT

A multi-media communication device may communicate with one or more sensors to obtain sensor data. The device may detect an incident based on communicating with the one or more sensors. The incident may be detected based on the sensor data associated with the one or more sensors. The device may process the sensor data and other information to confirm the incident based on detecting the incident. The device may transmit information, to one or more other devices, to initiate an incident response based on confirming the incident. The device may provide, for display via a user interface of the multi-media communication device, information associated with indicating that the incident response is initiated. The information may identify the incident response.

20 Claims, 8 Drawing Sheets

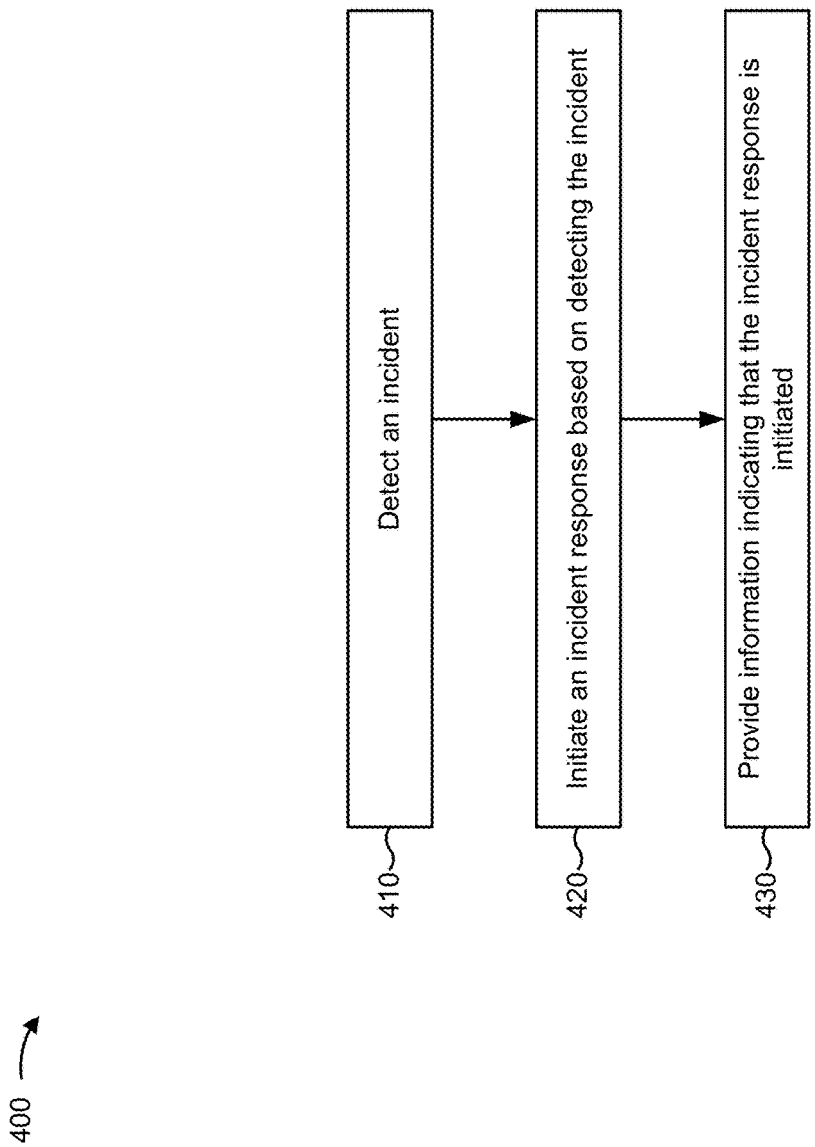

DEVICE BASED INCIDENT DETECTION AND NOTIFICATION

RELATED APPLICATION(S)

This application claims priority under 35 U.S.C. § 119 to U.S. Provisional Patent Application No. 62/242,499, filed on Oct. 16, 2015, the content of which is incorporated by reference herein in its entirety.

BACKGROUND

A first party (e.g., a user) may be involved in an incident, and may contact another party (e.g., emergency services personnel, a relative, etc.) regarding the incident. The first party may report the incident to the second party, and may provide information associated with the incident such as a name, a health status, a report of the incident, or the like. For example, the user may place a voice call to a dispatcher to indicate that the user was in a vehicle accident, and may request emergency services, towing, or the like.

SUMMARY

According to some possible implementations, a multi-media communication device may include one or more processors. The one or more processors may communicate with one or more sensors to obtain sensor data. The one or more processors may detect an incident based on communicating with the one or more sensors. The incident may be detected based on the sensor data associated with the one or more sensors. The one or more processors may process the sensor data and other information to confirm the incident based on detecting the incident. The one or more processors may transmit information, to one or more other devices, to initiate an incident response based on confirming the incident. The one or more processors may provide, for display via a user interface of the multi-media communication device, information associated with indicating that the incident response is initiated. The information may identify the incident response.

According to some possible implementations, a non-transitory computer-readable medium may store one or more instructions that, when executed by one or more processors, may cause the one or more processors to detect a vehicle accident associated with a vehicle. The one or more instructions, when executed by one or more processors, may cause the one or more processors to automatically obtain, based on detecting the vehicle accident, information associated with identifying an insurance policy associated with the vehicle. The one or more instructions, when executed by one or more processors, may cause the one or more processors to automatically initiate, based on obtaining the information identifying the insurance policy associated with the vehicle, an insurance claim for the vehicle accident. The one or more instructions, when executed by one or more processors, may cause the one or more processors to provide, for display via a user interface, information indicating that the insurance claim for the vehicle accident is initiated.

According to some possible implementations, a method may include detecting, by a device, an acceleration via an acceleration sensor of the device. The method may include determining, by the device, that the acceleration satisfies an acceleration threshold. The method may include determining, by the device, that an incident has occurred within a proximity to the device based on determining that the acceleration satisfies the acceleration threshold. The method may include determining, by the device, incident information relating to a user of the device based on determining that the incident has occurred. The method may include initiating, by the device, an incident claim for the user based on the incident information relating to the user of the device. The method may include providing, by the device, information indicating that the incident claim is initiated based on initiating the incident claim.

BRIEF DESCRIPTION OF THE DRAWINGS

FIG. 4 is a flow chart of an example process for automatic incident notification and processing.

DETAILED DESCRIPTION

The following detailed description of example implementations refers to the accompanying drawings. The same reference numbers in different drawings may identify the same or similar elements.

After an incident, such as a vehicle accident or the like, a user may attempt to contact another party. The user may locate information identifying the other party, such as a contact card stored in the user's wallet, in a glovebox of the vehicle, or the like. The contact card may include printed contact information for the other party, such as a phone number or the like. The user may call the phone number and speak with the other party to obtain a service, such as an emergency response service, a towing service, or the like. However, the contact card may be lost or damaged as a result of the vehicle accident. Moreover, the user may be distracted by the incident; under the influence of post-accident stress, trauma, narcotics, alcohol, etc.; or the like causing the user to be unable to contact the other party and/or provide accurate information to the other party. Furthermore, traffic noise at a location of the incident may make it difficult to effectively communicate information. Implementations, described herein, may automatically detect an incident and notify another party of the incident. In this way, the other party can provide prompt assistance to a user. Moreover, automatically detecting and providing a notification of an incident reduces a likelihood that incorrect information is included in an incident report relative to attempting to provide information via a phone call from a noisy location at which the incident occurred.

Figure 1A:
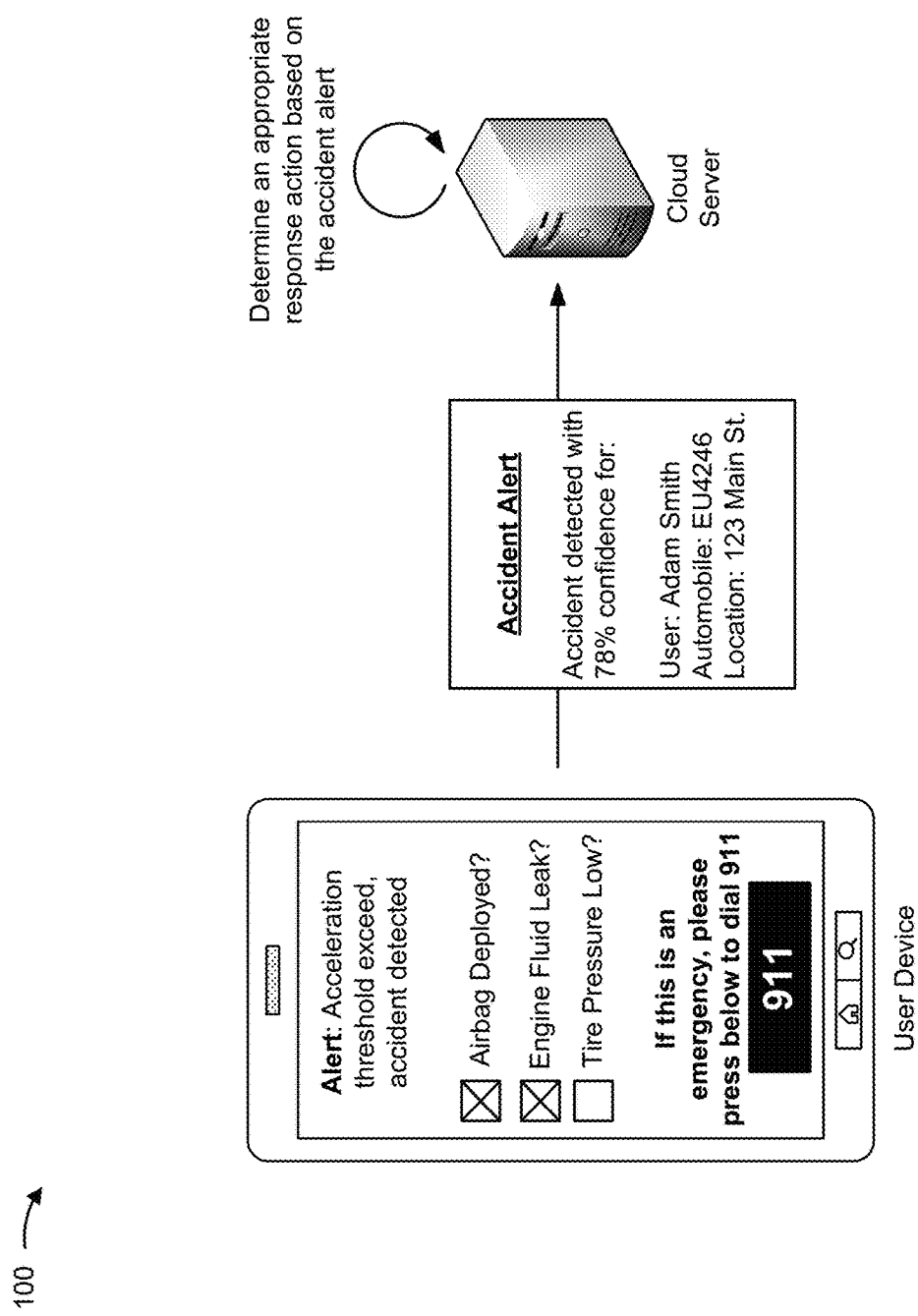
FIGS. 1A and 1B are diagrams of an overview of an example implementation described herein.
Figure 1B:
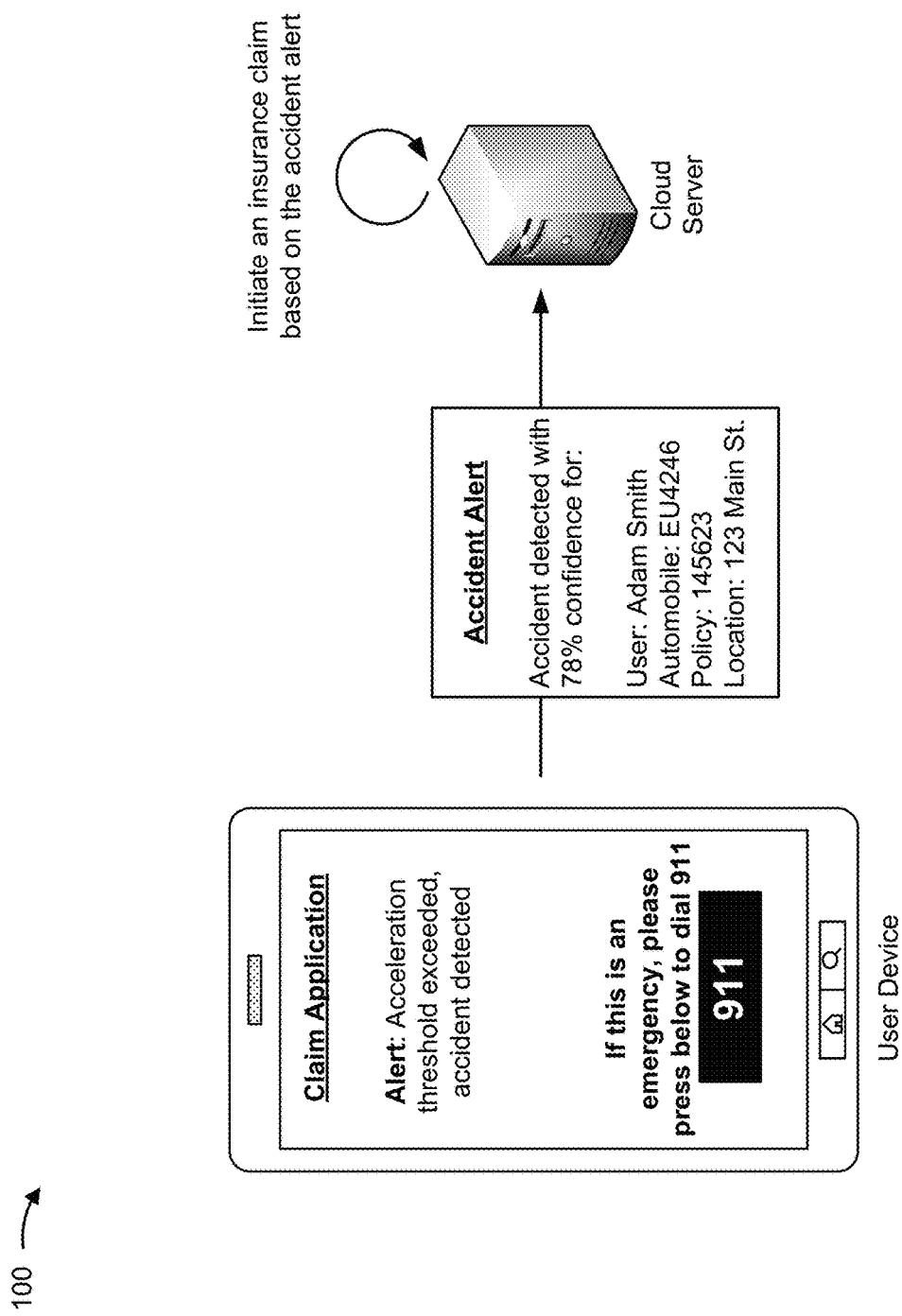

FIGS. 1A and 1B are diagrams of an overview of an example implementation 100 described herein.

As shown in FIG. 1A, a user device may detect an incident. For example, the user device may detect a threshold acceleration (e.g., via an accelerometer), an airbag deployment (e.g., via a connection to a controller area network (CAR network) of the vehicle), an engine fluid leak (e.g., via the connection to the CAR network), or the like. The user device may provide, to a cloud server, an accident alert that identifies the accident, a user of the user device, a location of the accident, or the like. The cloud server may determine and perform an appropriate response action based on the accident alert. For example, the cloud server may dispatch emergency response personnel, a tow-truck, or the like. Additionally, or alternatively, the cloud server may provide information to the user. For example, when the cloud server determines, based on the accident alert, that the vehicle is in a condition to be driven, the cloud server may provide information identifying a nearby repair shop. In this way, the user device automatically provides information associated with an incident, triggers a response action to assist the user, or the like. Based on automatically triggering the response action, the cloud server may reduce a utilization of wireless network resources relative to the user device being utilized to contact a repair shop, obtain directions, contact emergency response personnel, or the like.

As shown in FIG. 1B, in another example, a user device may detect another incident (e.g., an underwritten incident, such as an accident). For example, the user device may detect, via an accelerometer, a threshold acceleration (e.g., a deceleration) that is determined to correspond to an incident (e.g., a vehicle accident). The user device may provide an alert to a user of the user device indicating that the user device detected the incident. For example, the user device may indicate that a vehicle accident was detected. The user device may provide a user interface element for alerting an emergency responder (e.g., by placing a 911 call) based on detecting the incident. The user device may capture and store information, such as a video at a location of the vehicle accident, a picture at the location of the vehicle accident, audio at the location of the vehicle accident, or the like.

The user device may transmit an alert to a server (e.g., a cloud server) associated with an insurance provider. For example, the user device may automatically provide information indicating detection of the incident, a confidence value for detecting the incident, or the like. In another example, the user device may transmit the alert based on receiving a trigger from a user, such as a user interaction with a user interface, a voice command, or the like. The user device may include contextual information in the alert. For example, the user device may provide information identifying the user, a vehicle operated by the user, an insurance policy number associated with the user, or the like (e.g., based on stored information regarding the user, such as an insurance policy stored via a mobile wallet of the user device). Additionally, or alternatively, the user device may provide location information (e.g., a location at which the incident is determined to have occurred), weather information at the location (e.g., information indicating that it is raining at the location, snowing at the location, etc.), a recording captured at the location (e.g., an audio recording, a video recording, a set of images, etc. captured at the location), or the like. The cloud server may receive the alert, and may be triggered to automatically initiate an incident claim (e.g., an insurance claim) for the user. For example, the cloud server may initiate a first notification of loss or first notice of loss (FNOL) insurance claim filing.

In another example, the user device and the cloud server may exchange one or more other messages. For example, the cloud server may request confirmation of the incident and the user device may provide confirmation. Additionally, or alternatively, the cloud server may provide information indicating that an incident response is initiated, such as an identification number for the insurance claim, information identifying an approved repair shop within a particular proximity of the user device's location, or the like. Additionally, or alternatively, the cloud server may request follow up information regarding the incident, such as information identifying a type of incident (e.g., vehicle accident, train accident, bus accident, bicycle accident, etc.), information identifying another party to the incident (e.g., another driver), or the like. Additionally, or alternatively, the cloud server may be triggered to automatically locate and dispatch roadside assistance, emergency assistance, or the like.

Additionally, or alternatively, the user device may utilize a mobile wallet to automatically pay an insurance deductible associated with a repair, a tow-truck dispatch cost, or the like based on payment information stored via the mobile wallet. Similarly, the user device may automatically apply for a discount (e.g., a discounted car rental based on the user device storing a car rental membership for the user via the mobile wallet). Similarly, the user device may transmit payment information, discount information, or the like to the cloud server, and the cloud server may automatically perform a payment, apply for a discount, or the like.

In this way, the user device causes insurance services (e.g., claims services, repair services, etc.) to be performed more rapidly for the user relative to the user manually requesting the insurance services. Moreover, by automatically generating and providing user information, the user device may reduce a likelihood that information is incorrectly provided for an insurance claim relative to a user manually providing insurance information. Furthermore, automatically generating and providing an alert may reduce power consumption and utilization of network resources for the user device relative to the user placing a voice call to provide insurance information, thereby increasing a likelihood that the user device is available for further use by the user.

Figure 2:
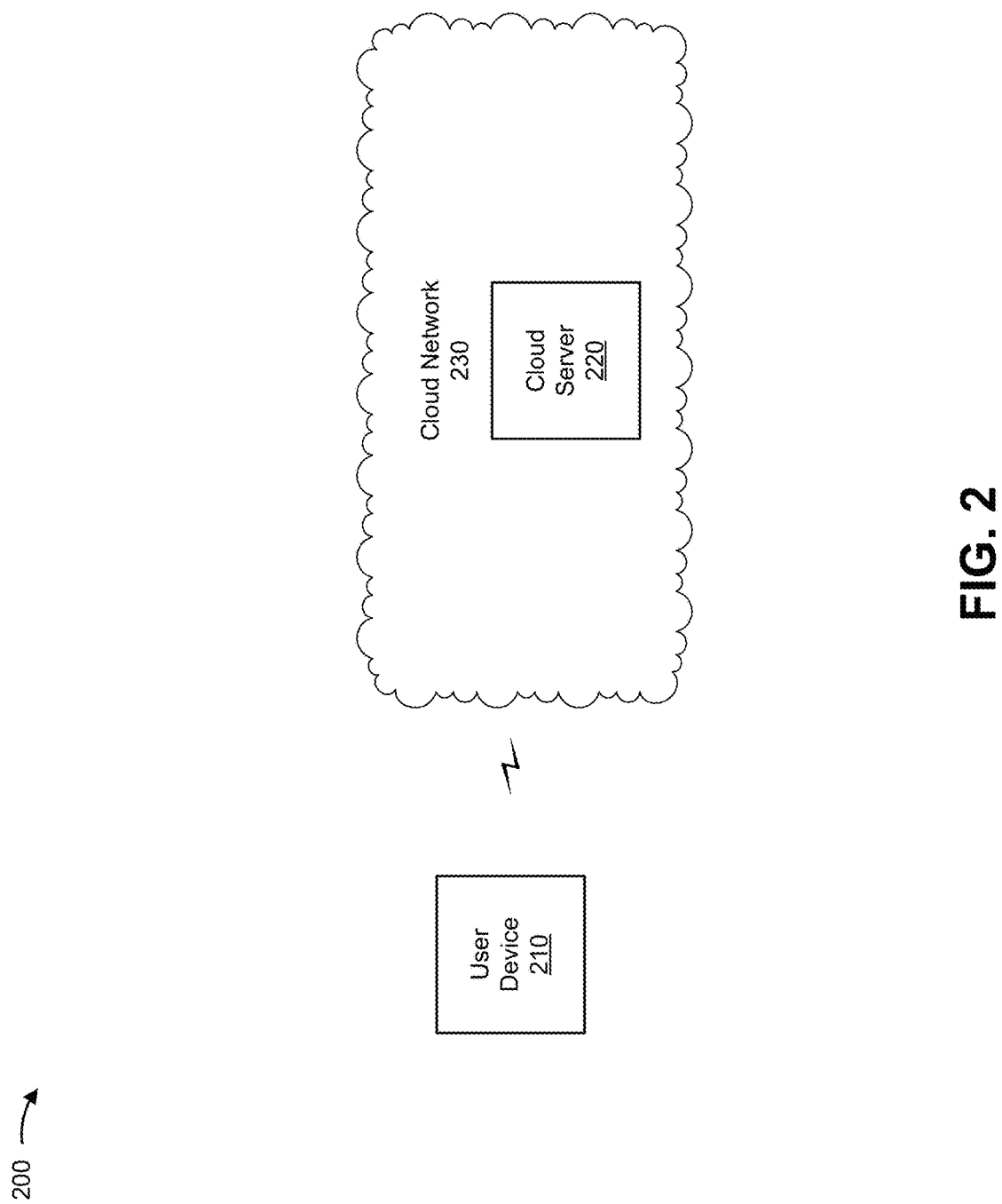
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a cloud server 220, and a cloud network 230. Devices of environment 200 may interconnect via wired connections, wireless connections, or a combination of wired and wireless connections.

User device 210 may include one or more devices capable of receiving, generating, storing, processing, and/or providing information associated with an incident. For example, user device 210 may include a communication and/or computing device, such as a multi-media communication (e.g., a mobile device capable of two or more of voice transmission, data transmission, video transmission, and/or the like), a mobile phone (e.g., a smart phone, a radiotelephone, etc.), a computer (e.g., a laptop computer, a tablet computer, a handheld computer, a desktop computer, etc.), a wearable communication device (e.g., a smart wristwatch, a pair of smart eyeglasses, etc.), or a similar type of device. In some implementations, user device 210 may be associated with a set of sensors, such as an accelerometer, a location sensor (e.g., a global positioning system (GPS) unit), an atmospheric sensor, or the like. In some implementations, user device 210 may connect to a device of a vehicle, such as in-vehicle computer associated with a CAR network, a set of in-vehicle sensors, or the like. In some implementations, user device 210 may receive information from and/or transmit information to another device in environment 200.

Cloud server 220 may include one or more devices capable of storing, processing, and/or routing information associated with an incident. For example, cloud server 220 may include a server that receives an alert from user device 210 and automatically initiates an insurance claim for a user. In some implementations, cloud server 220 may include a communication interface that allows cloud server 220 to receive information from and/or transmit information to other devices in environment 200. While cloud server 220 is described as a resource in a cloud computing network, such as cloud network 230, cloud server 220 may operate external to a cloud computing network, in some implementations.

Cloud network 230 may include an environment that delivers computing as a service, whereby shared resources, services, etc. may be provided by cloud server 220 to store, process, and/or route information associated with an employment diversity plan. Cloud network 230 may provide computation, software, data access, storage, and/or other services that do not require end-user knowledge of a physical location and configuration of a system and/or a device that delivers the services (e.g., cloud server 220). As shown, cloud network 230 may include cloud server 220 and/or may communicate with user device 210 via one or more wired or wireless networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
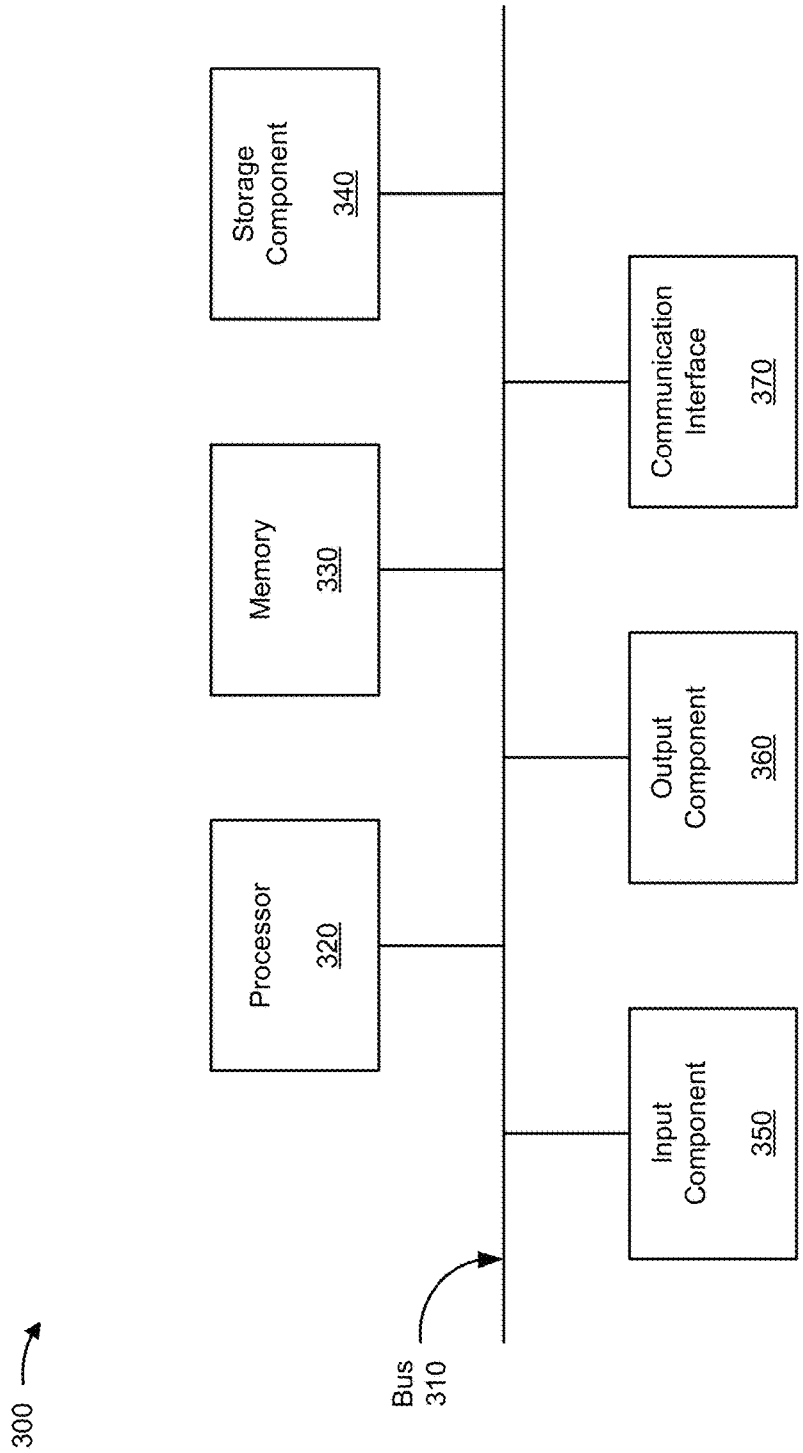
FIG. 3 is a diagram of example components of one or more devices of FIG. 2.

FIG. 3 is a diagram of example components of a device 300. Device 300 may correspond to user device 210 and/or cloud server 220. In some implementations, user device 210 and/or cloud server 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for automatic incident notification and processing. In some implementations, one or more process blocks of FIG. 4 may be performed by user device 210. In some implementations, one or more process blocks of FIG. 4 may be performed by another device or a group of devices separate from or including user device 210, such as cloud server 220.

As shown in FIG. 4, process 400 may include detecting an incident (block 410). For example, user device 210 may detect the incident. The incident may refer to an accident, such as a vehicle accident or the like. A vehicle may refer to an engine or human powered conveyance, such as an automobile, a bus, a truck, an airplane, a train, a bicycle, a Segway, or the like. Additionally, or alternatively, a vehicle accident may refer to a pedestrian who is injured by a vehicle. Additionally, or alternatively, the incident may refer to an incident associated with falling down a set of stairs, falling off a cliff or mountain (e.g., a hiker, a skier, etc.), or the like.

As an example, user device 210 may, when being utilized in a vehicle, detect a vehicle accident. In some implementations, user device 210 may detect the incident based on one or more sensors of user device 210. For example, user device 210 may detect an acceleration (e.g., via an acceleration sensor, such as an accelerometer of user device 210 or the like) that exceeds an acceleration threshold, which corresponds to a vehicle collision. In this case, user device 210 may detect the incident based on determining that the acceleration exceeds the acceleration threshold. In another example, user device 210 may, when utilized by a hiker or skier, detect an acceleration that corresponds to the hiker or skier falling down a portion of a mountain (e.g., another type of incident, which may trigger an automated health insurance claim, an emergency rescue, etc.). In another example, user device 210 may detect an acceleration that corresponds to a user falling down a flight of stairs (e.g., another type of incident, which may trigger an automated health insurance claim, an emergency rescue, etc.).

Additionally, or alternatively, user device 210 may detect the incident based on receiving information from another sensor. For example, when user device 210 connects to an airbag deployment sensor of a vehicle (e.g., a car sensor), user device 210 may receive sensor data from the airbag deployment sensor, and may detect the incident based on receiving the sensor data indicating that an airbag is deployed. Additionally, or alternatively, user device 210 may detect the incident based on other sensor data, such as a fluid leakage notification, an engine warning, an antilock brake deployment notification, an impact notification, a recorded sound, a recorded video, or the like. Additionally, or alternatively, user device 210 may detect the incident based on detecting an interaction with a user interface. For example, a user may interact with a user interface to indicate to user device 210 that an incident has occurred.

In some implementations, user device 210 may determine a confidence value associated with detecting an incident. For example, user device 210 may determine that an alert from a car sensor indicating a utilization of anti-lock brakes corresponds to a particular percentage likelihood of an incident having occurred. In this case, user device 210 may detect the incident based on the confidence value (e.g., the particular percentage likelihood) exceeding a confidence value threshold. Additionally, or alternatively, user device 210 may process the sensor data and/or other information (e.g., contextual information, such as weather data, road condition data, location data, time of day data, etc.) to confirm that the incident is correctly detected, and may generate a confidence value based on processing the sensor data and/or the other information. In some implementations, user device 210 may utilize a confidence threshold to determine whether to report the incident. For example, when the confidence value exceeds a threshold, user device 210 may transmit a notification of the incident to dispatch emergency services personnel and when the confidence value fails to exceed the threshold, user device 210 may not transmit the notification. In this way, user device 210 reduces a likelihood of incorrectly dispatching emergency services personnel. Additionally, or alternatively, when a first threshold is satisfied, user device 210 may dispatch emergency services personnel; when the first threshold is not satisfied and a second, lower threshold is satisfied, user device 210 may connect a user with a dispatcher for the user to confirm that emergency services personnel are needed; and when the second threshold is not satisfied, user device 210 may determine that an incident has not occurred. In this way, user device 210 may perform different actions based on a confidence that an incident is detected.

In some implementations, user device 210 may request confirmation of an incident. For example, user device 210 may detect an incident, and may display a user interface element associated with prompting a user to confirm that the incident occurred. Additionally, or alternatively, user device 210 may provide an alert to cloud server 220 indicating that the incident is detected, and may receive a message from cloud server 220 requesting that user device 210 confirm that the incident occurred. In this case, user device 210 may be caused to provide a user interface element associated with prompting a user to confirm that the incident occurred, and may transmit a confirmation to cloud server 220 based on detecting a user interaction associated with indicating that the incident occurred.

As further shown in FIG. 4, process 400 may include initiating an incident response based on detecting the incident (block 420). For example, user device 210 may initiate the incident response based on detecting the incident. In some implementations, user device 210 may transmit information to cloud server 220 to initiate the incident response. For example, user device 210 may transmit information identifying a user of user device 210, a device identifier of user device 210 (e.g., a phone number, a network address, etc.), a location identifier, an insurance policy identifier (e.g., insurance information identifying an insurance policy of a policyholder (the user) obtained from a mobile wallet of user device 210), a payment identifier (e.g., obtained from a mobile wallet of user device 210), or the like. In some implementations, user device 210 may transmit an alert to cloud server 220, and cloud server 220 may obtain information (e.g., insurance policy information, payment information, etc.) from a data structure storing information for a user of user device 210. For example, user device 210 may transmit a message to cloud server 220 including a user identifier for a policyholder, and cloud server 220 may obtain stored insurance policy information for the policyholder based on the user identifier. In this way, user device 210 automatically provides information associated with processing an insurance claim.

Additionally, or alternatively, user device 210 may transmit information associated with the accident, such as atmospheric information (e.g., temperature information, precipitation information, etc.), a recordation associated with the incident (e.g., audio data, video data, image data, or the like), sensor information (e.g., information from a sensor of user device 210, such as an acceleration associated with the incident; information from a set of vehicle sensors, such as vehicle sensor data identifying whether a driver was braking prior to the incident, whether the driver was driving erratically prior to the incident; etc.), or the like. In this way, user device 210 automatically provides information associated with processing an insurance claim, dispatching emergency services, or the like, thereby reducing a likelihood of incorrect information being provided or information being omitted from an incident report relative to a user filling out an incident report after an incident.

In some implementations, user device 210 may cause an insurance claim to be initiated as a response to the incident. For example, user device 210 may cause cloud server 220 to generate a first notice of loss (FNOL) filing, and provide information associated with the FNOL filing to another user device 210 being utilized by an insurer (e.g., an insurance agent). Additionally, or alternatively, user device 210 may automatically generate an incident report based on sensor data, and may transmit the incident report to cloud server 220 for assignment to an insurer (e.g., an insurance agent).

In some implementations, user device 210 may cause emergency services to be dispatched to assist a user as a response to the incident. For example, based on a user requesting emergency services, emergency services may be dispatched by user device 210 (e.g., via cloud server 220). Additionally, or alternatively, based on a user failing to respond to a user interface prompt (which may indicate that the user is incapacitated), user device 210 may transmit a message to cloud server 220 to cause cloud server 220 to dispatch emergency services to a location of user device 210. Additionally, or alternatively, user device 210 may determine that one or more criteria associated with dispatching emergency services are satisfied, such as determining that the user is injured, that the user is unable to exit the vehicle, that the vehicle is on fire, etc.), and may dispatch emergency services based on the one or more criteria being satisfied. In some implementations, user device 210 may directly transmit an alert to an emergency responder to request assistance for the user, such as by transmitting information to a 911 dispatcher.

In some implementations, user device 210 may cause an insurance claim to be processed as a response to the incident. For example, based on causing an insurance claim to be dispatched to an insurance agent, user device 210 may cause the insurance claim to be approved (or rejected), payment associated with the insurance claim to be automatically processed, a rental car to be automatically reserved, lodging to be automatically arranged, or the like. In some implementations, user device 210 may cause a particular loyalty bonus to be utilized when causing the insurance claim to be approved, such as causing a rental card loyalty program to be utilized when reserving a rental car, a hotel loyalty program to be utilized when reserving a hotel, or the like. In some implementations, user device 210 may cause an insurance policy to be updated based on causing the insurance claim to be approved or rejected. For example, user device 210 may update a mobile wallet to identify an updated insurance premium associated with the insurance policy. In this way, user device 210 and/or cloud server 220 reduce a utilization of user device 210 by a user to make arrangements after an incident relative to the user being required to perform phone calls to an insurance agent, a rental car company, etc., thereby reducing a utilization of processing resources, a power consumption, a utilization of network resources, or the like.

In some implementations, user device 210 may cause non-emergency assistance to be provided to the user. For example, user device 210 may transmit a message to cloud server 220 to cause cloud server 220 to dispatch a tow-truck to a location of user device 210. Additionally, or alternatively, user device 210 may directly transmit an alert to a tow-truck company to request assistance for the user. In some implementations, user device 210 may automatically locate a repair shop, within a threshold proximity of user device 210, for the user. For example, user device 210 may request, from cloud server 220, information identifying a repair shop authorized to perform repairs on a vehicle of a user of user device 210 based on an insurance policy of the user. In this case, user device 210 may receive information identifying a location of the repair shop, contact information for the repair shop, directions to the repair shop, or the like. Additionally, or alternatively, user device 210 may cause an alert to be transmitted to the repair shop to indicate that a vehicle is to be transported to the repair shop, to identify insurance and/or billing information associated with the vehicle, or the like.

As further shown in FIG. 4, process 400 may include providing information indicating that the incident response is initiated (block 430). For example, user device 210 may provide information indicating that the incident response is initiated. In some implementations, user device 210 may provide information indicating that an insurance claim is initiated. For example, user device 210 may provide information identifying the insurance claim, an insurance agent assigned to the insurance claim, or the like. In some implementations, user device 210 may provide information indicating a resolution of the insurance claim. For example, user device 210 may provide information indicating whether the insurance claim is accepted, a payout for the insurance claim, a deductible for the insurance claim, a receipt for a deductible that was automatically paid, or the like. In some implementations, user device 210 may provide information identifying one or more services that have been arranged for the user. For example, user device 210 may provide information indicating that emergency response personnel have been dispatched, that a tow-truck has been dispatched, or the like. Additionally, or alternatively, user device 210 may provide instructions to a user, such as instructions regarding safety procedures, instructions regarding further steps for submitting or verifying an insurance claim, or the like.

In some implementations, user device 210 may receive information identifying a transaction. For example, when user device 210 automatically executes a transaction related to the incident for a user, such as paying an insurance deductible, reserving a rental car, or the like, user device 210 may receive information identifying the transaction for display to the user.

In some implementations, user device 210 may provide follow-up information based on performing one or more actions as a response to the incident. For example, based on detecting a user interaction with a user interface, user device 210 may obtain (e.g., from cloud server 220) updated information regarding a status of an insurance claim initiated as a response to the incident, and may provide the updated information regarding the status for display. In this way, user device 210 permits the user to track a status of an insurance claim, thereby reducing a utilization of network resources based on reducing a likelihood that a voice call is utilized to track the insurance claim.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
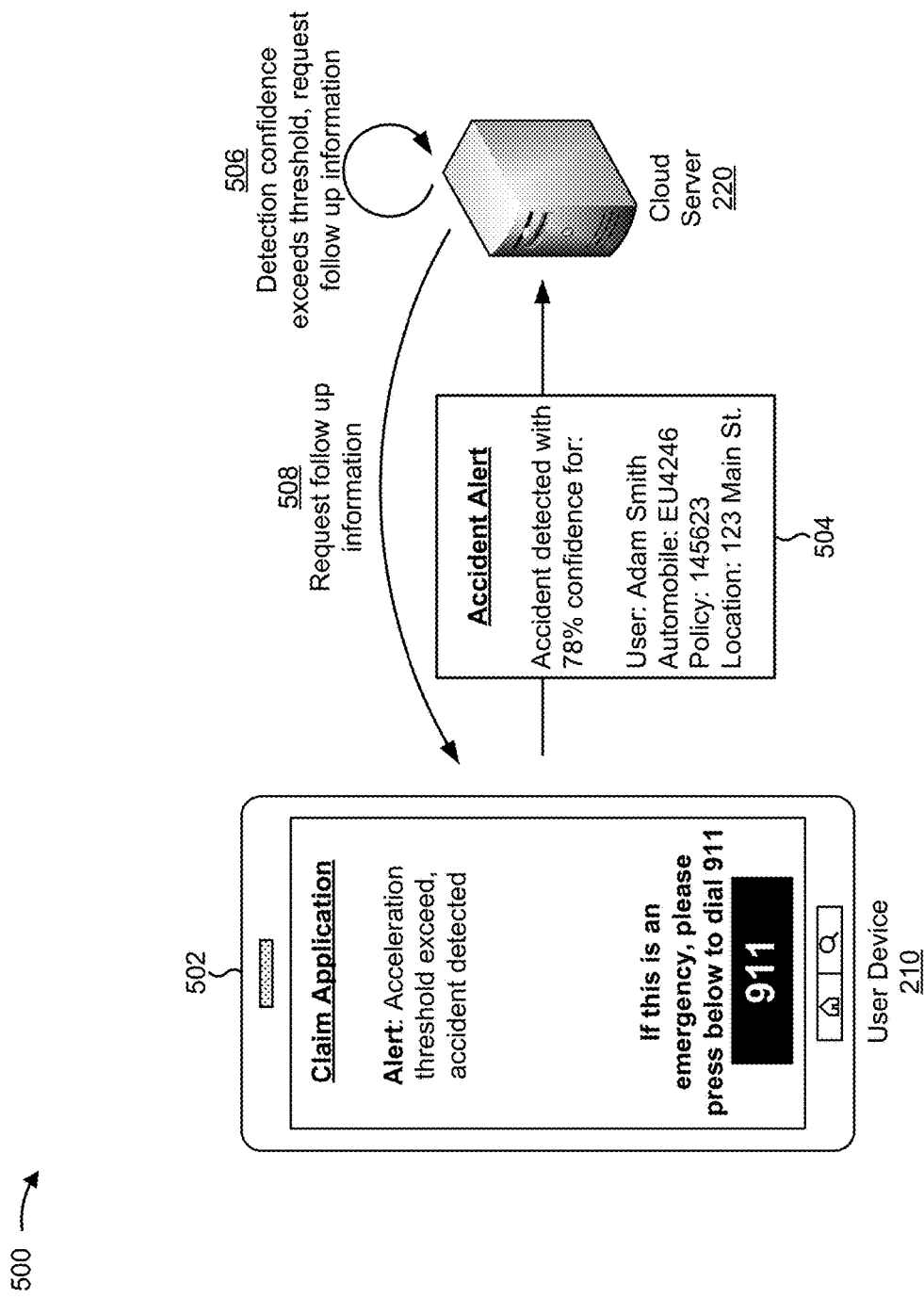
FIGS. 5A-5C are diagrams of an example implementation relating to the example process shown in FIG. 4.
Figure 5B:
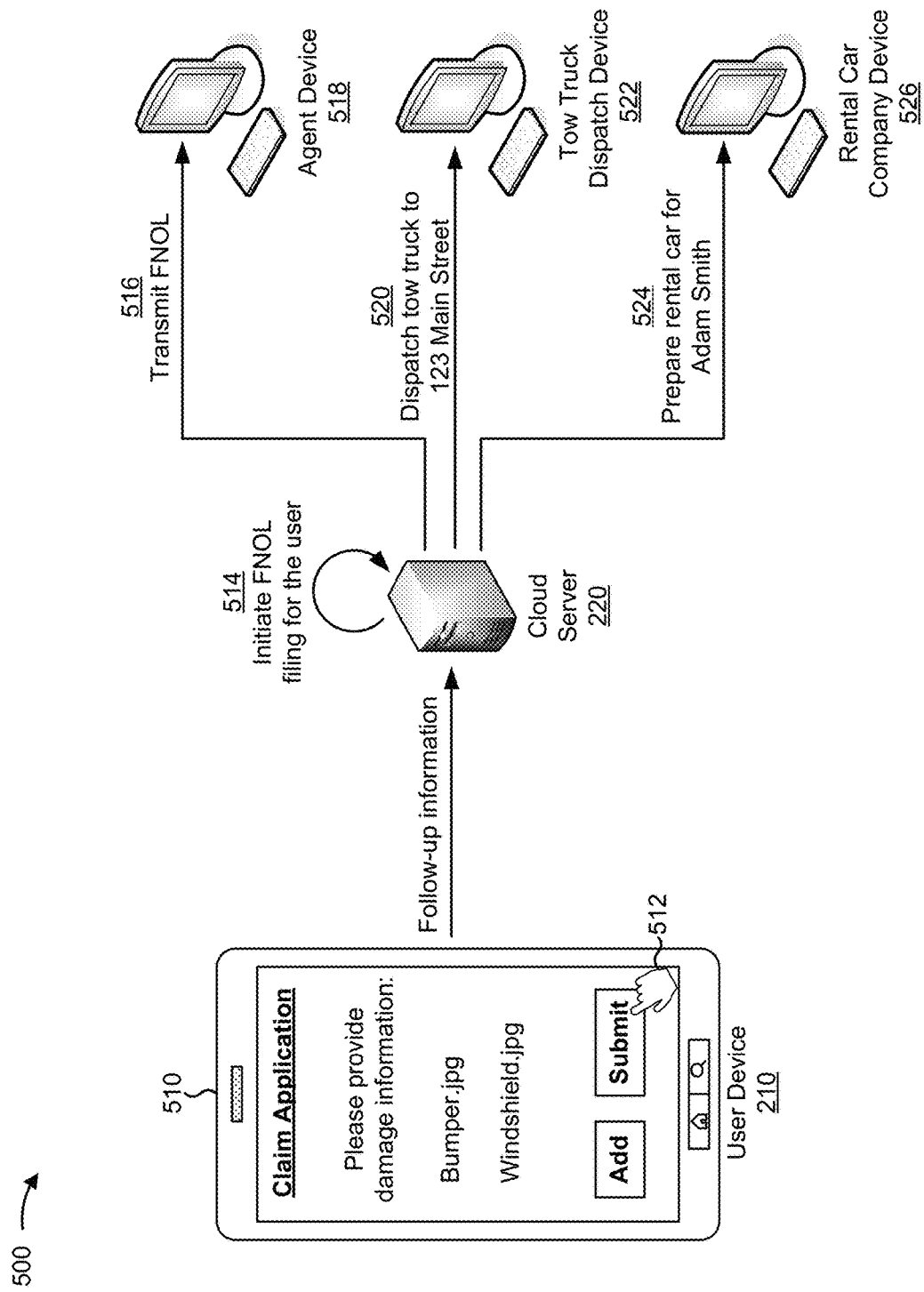
Figure 5C:
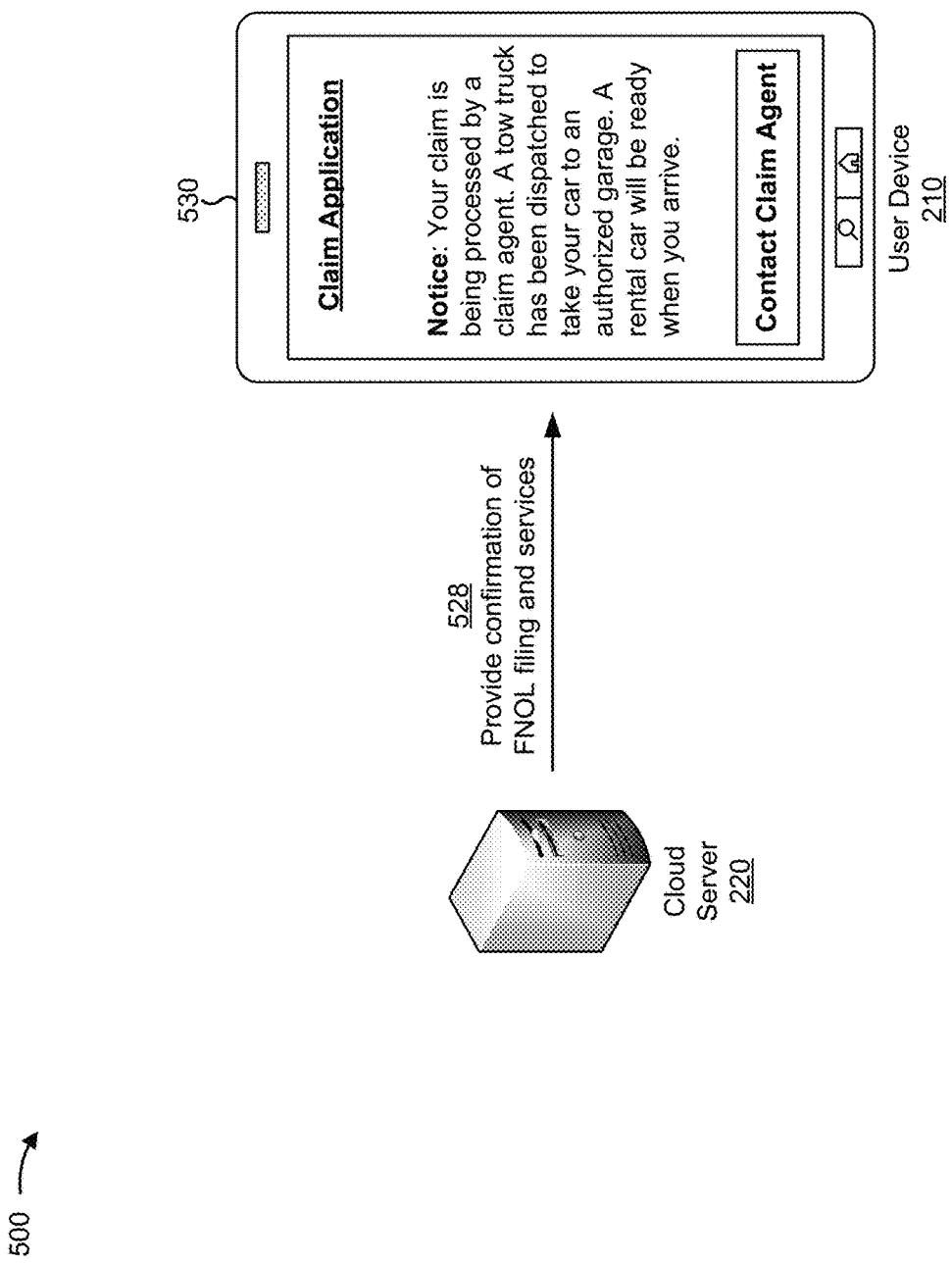

FIGS. 5A-5C are diagrams of an example implementation 500 relating to example process 400 shown in FIG. 4. FIGS. 5A-5C show an example of automatic incident notification and processing.

As shown in FIG. 5A, and by reference number 502, user device 210 provides an alert indicating that an incident is detected based on detecting a threshold acceleration. As shown by reference number 504, user device 210 transmits a notification of the incident to cloud server 220. The notification of the incident includes information identifying a confidence value for a determination that the threshold acceleration corresponds to a vehicle accident, a user identifier, a vehicle identifier, a policy identifier, and a location identifier. As shown by reference number 506, based on the confidence value exceeding a threshold, cloud server 220 determines to request follow up information relating to the incident. As shown by reference number 508, user device 210 receives the request for follow up information. Assume that the user utilizes user device 210 to capture a set of images as follow up information.

As shown in FIG. 5B, and by reference number 510, user device 210 provides a user interface identifying follow up information (e.g., the set of images). As shown by reference number 512, based on a user interaction with the user interface, user device 210 submits the follow up information to cloud server 220 to cause a set of actions to be performed as an incident response to the vehicle accident. As shown by reference number 514, cloud server 220 is caused to initiate an FNOL filing for an insurance claim. As shown by reference number 516, cloud server 220 is caused to transmit the FNOL filing to an agent device 518 for review by an insurance agent. In this way, an insurance claim is automatically initiated by user device 210, thereby reducing a usage of user device 210 by the user to initiate the insurance claim relative to the user initiating the insurance claim via a phone call.

As further shown by FIG. 5B, and by reference number 520, cloud server 220 is caused to transmit a message to tow-truck dispatch device 522 to dispatch a tow-truck to a location of user device 210. As shown by reference number 524, cloud server 220 is caused to transmit a message to rental car company device 526 to reserve a rental car for the user of user device 210. In this way, user device 210 and/or cloud server 220 initiate services (e.g., tow-truck service, car rental service, etc.) for a user, thereby reducing a usage of user device 210 by the user to initiate the services relative to the user initiating the services via a phone call.

As shown in FIG. 5C, and by reference number 528, cloud server 220 transmits information associated with confirming transmission of the FNOL filing and initiation of the services. As shown by reference number 530, user device 210 provides, for display via a user interface, information indicating that the claim is being processed by an insurance agent, that a tow-truck is being dispatched, and that a rental car is being made ready. The user interface includes a user interface element permitting the user to directly contact the insurance agent to resolve any issues, thereby facilitating communication between the user and the insurance agent.

As indicated above, FIGS. 5A-5C are provided merely as an example. Other examples are possible and may differ from what was described with regard to FIGS. 5A-5C.

Based on reducing utilization of user device 210 relative to requiring a user to manually initiate an insurance claim or reserve services (e.g., emergency response services, towing services, lodging services, etc.), user device 210 may reserve a greater amount of processing resources, network resources, and/or battery resources for other tasks, such as contacting family, confirming alternate travel arrangements, or the like, relative to the user being required to place phone calls to initiate the insurance claim or reserve the services. Moreover, automatically providing information may reduce a likelihood that incorrect information or incomplete information is provided after an accident, thereby improving a quality of responses that are taken due to the accident.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, a voice-based user interface, a gesture-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A non-transitory computer-readable medium storing instructions, the instructions comprising:
one or more instructions that, when executed by one or more processors of a device, cause the one or more processors to:
detect an acceleration via an acceleration sensor of the device;

determine that the acceleration satisfies an acceleration threshold;

receive sensor output information, via a controller area network of a vehicle, based on activation of one or more vehicle sensors communicatively coupled with the controller area network of the vehicle;

determine that a vehicle accident has occurred within a proximity to the device based on determining that the acceleration satisfies the acceleration threshold and based on the sensor output information;

obtain contextual information associated with the vehicle accident, the contextual information including one or more of:
   weather data,
   road condition data,
   location data, or
   a time of day data;

determine a confidence value associated with determining that the vehicle accident has occurred and based on the contextual information;

determine that the confidence value satisfies a confidence threshold;

automatically generate, based on determining that the vehicle accident has occurred and determining that the confidence value satisfies the confidence threshold, a notification including data related to the vehicle accident; and initiate, based on the data relating to the vehicle accident, communication of the notification with one or more of the following:
   a non-emergency response device,
   an emergency response device, or
   a device associated with an insurance company; and provide, for display via a user interface, information indicating that the communication is initiated.

2. The computer-readable medium of claim 1, where the one or more instructions, cause the one or more processors to automatically initiate an insurance claim, and further cause the one or more processors to:
   initiate a first notice of loss (FNOL) filing for the insurance claim; and
   transmit the FNOL filing for review by an insurer.

3. The computer-readable medium of claim 2, where the one or more instructions, that cause the one or more processors to automatically initiate the insurance claim, cause the one or more processors to:
   include the data in a report of the vehicle accident; and
   transmit the report to another device for review by an insurer.

4. The computer-readable medium of claim 3, where the data relating to the vehicle accident includes at least one of:
   audio data,
   video data,
   image data,
   atmospheric data,
   vehicle sensor data, or
   driving data.

5. The computer-readable medium of claim 1, where the sensor output information, received via the controller area network of the vehicle, is indicative of at least one of:
   an airbag deployment notification,
   a fluid leakage notification,
   an engine warning,
   an antilock brake deployment notification, or
   an impact notification.

6. The computer-readable medium of claim 2, where the one or more instructions, when executed by the one or more processors, cause the one or more processors to:
   identify one or more costs associated with the insurance claim;
   obtain payment information associated with a policyholder of an insurance policy; and
   automatically execute one or more transactions associated with paying the one or more costs associated with the insurance claim based on the payment information.

7. A method, comprising:
   detecting, by a device, an acceleration via an acceleration sensor of the device;
   determining, by the device, that the acceleration satisfies an acceleration threshold;
   receiving, by the device and from one or more sensors of a vehicle via a controller area network of the vehicle, vehicle sensor information based on activation of the one or more sensors of the vehicle;
   determining, by the device, that a vehicle accident has occurred based on determining that the acceleration satisfies the acceleration threshold and based on receiving the vehicle sensor information;
   determining, by the device, accident information based on determining that the vehicle accident has occurred;
   obtaining, by the device, contextual information associated with the vehicle accident,
      the contextual information including one or more of:
         weather data,
         road condition data,
         location data, or
         a time of day data;
   determining, by the device, a confidence value associated with determining that the vehicle accident has occurred and based on the contextual information;
   determining, by the device, that the confidence value satisfies a confidence threshold;
   initiating, by the device, an incident claim based on determining that the confidence value satisfies the confidence threshold and based on the accident information; and
   providing, by the device, information indicating that the incident claim is initiated based on initiating the incident claim; and
   dispatching non-emergency services personnel a tow-truck or emergency services personnel based on determining that the confidence value satisfies the confidence threshold.

8. The method of claim 7, where dispatching non emergency services personal comprises:
   dispatching a tow-truck based on determining that the confidence value satisfies the confidence threshold.

9. The method of claim 7, further comprising:
   reserving a rental car or lodging based on determining that the confidence value satisfies the confidence threshold.

10. The method of claim 7, where the incident is an underwritten incident and the incident claim is an insurance claim; and
   the method further comprising:
      determining a location of a repair shop that is covered by an insurance policy associated with the insurance claim; and
      providing information identifying the repair shop.

11. The method of claim 7, further comprising:
   receiving a voice command; and
   where initiating the incident claim comprises:

initiating the incident claim based on receiving the voice command.

12. The method of claim 7, further comprising:
receiving a request for information regarding a status of the incident claim;
determining the status of the incident claim based on receiving the request for the information regarding the status of the incident claim; and
providing, via a user interface, information identifying the status of the incident claim.

13. A device, comprising:
a memory; and
one or more processors to:
  detect an acceleration via an acceleration sensor of the device;
  determine that the acceleration satisfies an acceleration threshold;
  receive sensor output information, via a controller area network of a vehicle, based on activation of one or more vehicle sensors communicatively coupled with the controller area network of the vehicle;
  determine that a vehicle accident has occurred within a proximity to the device based on determining that the acceleration satisfies the acceleration threshold and based on the sensor output information
  determine vehicle accident information relating to a user of the device based on determining that the vehicle accident has occurred;
  obtain contextual information associated with the vehicle accident,
    the contextual information including one or more of:
      weather data,
      road condition data, or
      a time of day data;
  determine a confidence value associated with determining that the vehicle accident has occurred and based on the contextual information;
  determine that the confidence value satisfies a confidence threshold;
  generate, based on determining that the vehicle accident has occurred and determining that the confidence value satisfies the confidence threshold, a notification including data related to the vehicle accident
  initiate, based on the data related to the vehicle accident, communication of the notification with one or more of the following:
    a non-emergency response device,
    an emergency response device, or
    a device associated with receiving an incident claim; and
  provide information indicating that the communication is initiated.

14. The device of claim 13, where the one or more processors, when initiating communication of the notification, are to:
  dispatch a tow-truck based on determining that the vehicle accident has occurred.

15. The device of claim 13, where the one or more processors are further to:
  reserve lodging based on determining that the vehicle accident has occurred.

16. The device of claim 13, where the one or more processors are further to:
  reserve a rental car based on determining that the vehicle accident has occurred.

17. The device of claim 13, where the vehicle accident is an underwritten vehicle accident and the vehicle accident claim is an insurance claim; and
  where the one or more processors are further to:
    determine a location of a repair shop that is covered by an insurance policy associated with the insurance claim; and
    provide information identifying the repair shop.

18. The device of claim 13, where the one or more processors are further to:
  receive a voice command; and
  where the one or more processors, when initiating communication of the notification are to:
    initiate a vehicle accident claim based on receiving the voice command.

19. The device of claim 13, where the one or more processors are further to:
  receive a request for information regarding a status of the vehicle accident claim;
  determine the status of the vehicle accident claim based on receiving the request for the information regarding the status of the vehicle accident claim; and
  provide, via a user interface, information identifying the status of the vehicle accident claim.

20. The computer-readable medium of claim 1, where the one or more instructions, when executed by the one or more processors, cause the one or more processors to:
  receive a voice command; and
  where the instructions, when executed by the one or more processors are to initiate communication of the notification, cause the one or more processors to:
    initiate a vehicle accident claim based on receiving the voice command.

* * * * *